US012369073B2

(12) United States Patent
Ciftcioglu et al.

(10) Patent No.: US 12,369,073 B2
(45) Date of Patent: Jul. 22, 2025

(54) CONGESTION CONTROL ALGORITHMS

(71) Applicant: QUALCOMM Incorporated, San Diego, CA (US)

(72) Inventors: Ertugrul Necdet Ciftcioglu, North Reading, MA (US); Arvind Vardarajan Santhanam, San Diego, CA (US); Yubing Jian, San Diego, CA (US); Reza Shahidi, San Diego, CA (US); Arnaud Meylan, San Diego, CA (US); Supratik Bhattacharjee, San Diego, CA (US); Gautham Hariharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 17/811,423

(22) Filed: Jul. 8, 2022

(65) Prior Publication Data

US 2024/0015581 A1 Jan. 11, 2024

(51) Int. Cl.
*H04W 28/02* (2009.01)
*H04L 41/147* (2022.01)
*H04L 41/16* (2022.01)

(52) U.S. Cl.
CPC ....... *H04W 28/0289* (2013.01); *H04L 41/147* (2013.01); *H04L 41/16* (2013.01); *H04W 28/0284* (2013.01)

(58) Field of Classification Search
CPC ....... H04L 47/12; H04L 41/147; H04L 41/16; H04L 41/0803; H04W 28/0289; H04W 24/02; H04W 28/0284
See application file for complete search history.

(56) References Cited

U.S. PATENT DOCUMENTS

| | | | |
|---|---|---|---|
| 12,132,704 B1* | 10/2024 | Brandwine | H04L 63/0263 |
| 2007/0248013 A1 | 10/2007 | Sridharan et al. | |
| 2017/0310593 A1 | 10/2017 | Kong et al. | |
| 2021/0092035 A1* | 3/2021 | Williams | H04L 47/22 |
| 2022/0245522 A1* | 8/2022 | Ramachandran | G06N 3/045 |
| 2022/0311711 A1* | 9/2022 | Jepsen | H04L 47/27 |
| 2023/0379258 A1* | 11/2023 | Zacks | H04L 47/283 |
| 2023/0402180 A1* | 12/2023 | Molero Leon | G06N 3/08 |
| 2023/0403318 A1* | 12/2023 | Spitulski | H04L 67/06 |

OTHER PUBLICATIONS

International Search Report and Written Opinion—PCT/US2023/020052—ISA/EPO—Jul. 18, 2023.
Zhou J., et al., "Antelope: A Framework for Dynamic Selection of Congestion Control Algorithms", 2021 IEEE 29th International Conference on Network Protocols (ICNP), IEEE, Nov. 1, 2021, XP034061297, 11 pages, abstract section I-VIII.

* cited by examiner

*Primary Examiner* — Brian D Nguyen
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may obtain one or more communication parameters associated with one or more communications to be transmitted by the UE. The UE may transmit the one or more communications based at least in part on a congestion control algorithm selected from a set of candidate congestion control algorithms, the congestion control algorithm selected based at least in part on the one or more communication parameters. Numerous other aspects are described.

30 Claims, 8 Drawing Sheets

CONGESTION CONTROL ALGORITHMS

FIELD OF THE DISCLOSURE

Aspects of the present disclosure generally relate to wireless communication and to techniques and apparatuses for congestion control algorithms.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

Some aspects described herein relate to a method of wireless communication performed by a user equipment (UE). The method may include obtaining one or more communication parameters associated with one or more communications to be transmitted by the UE. The method may include transmitting the one or more communications based at least in part on a congestion control algorithm selected from a set of candidate congestion control algorithms, the congestion control algorithm selected based at least in part on the one or more communication parameters.

Some aspects described herein relate to a UE for wireless communication. The user equipment may include a memory and one or more processors coupled to the memory. The one or more processors may be configured to obtain one or more communication parameters associated with one or more communications to be transmitted by the UE. The one or more processors may be configured to transmit the one or more communications based at least in part on a congestion control algorithm selected from a set of candidate congestion control algorithms, the congestion control algorithm selected based at least in part on the one or more communication parameters.

Some aspects described herein relate to a non-transitory computer-readable medium that stores a set of instructions for wireless communication by a UE. The set of instructions, when executed by one or more processors of the UE, may cause the UE to obtain one or more communication parameters associated with one or more communications to be transmitted by the UE. The set of instructions, when executed by one or more processors of the UE, may cause the UE to transmit the one or more communications based at least in part on a congestion control algorithm selected from a set of candidate congestion control algorithms, the congestion control algorithm selected based at least in part on the one or more communication parameters.

Some aspects described herein relate to an apparatus for wireless communication. The apparatus may include means for obtaining one or more communication parameters associated with one or more communications to be transmitted by the apparatus. The apparatus may include means for transmitting the one or more communications based at least in part on a congestion control algorithm selected from a set of candidate congestion control algorithms, the congestion control algorithm selected based at least in part on the one or more communication parameters.

Aspects generally include a method, apparatus, system, computer program product, non-transitory computer-readable medium, user equipment, base station, network entity, network node, wireless communication device, and/or processing system as substantially described herein with reference to and as illustrated by the drawings or specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
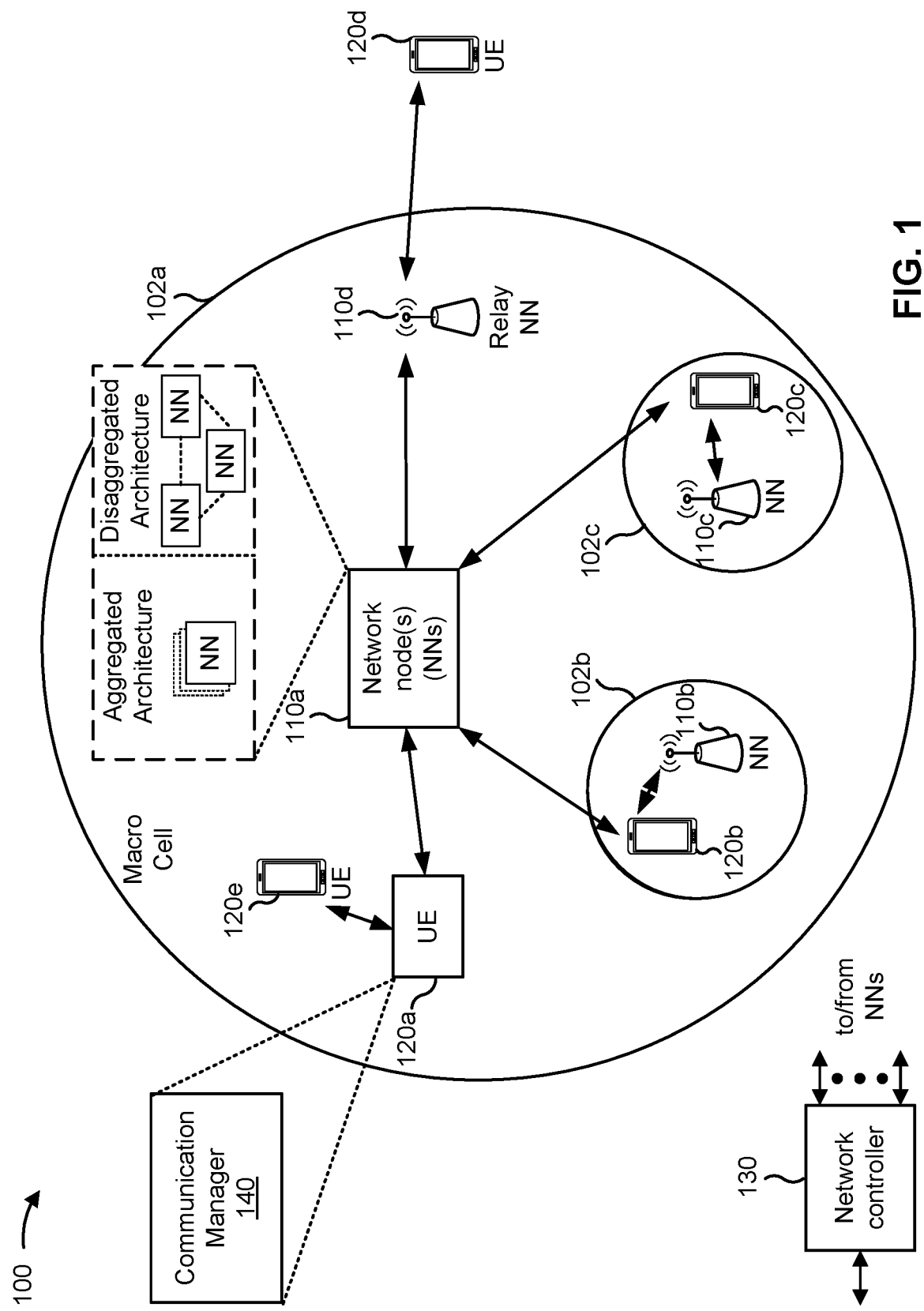
FIG. 1 is a diagram illustrating an example of a wireless network, in accordance with the present disclosure.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may obtain one or more communication parameters associated with one or more communications to be transmitted by the UE; and transmit the one or more communications based at least in part on a congestion control algorithm selected from a set of candidate congestion control algorithms, the congestion control algorithm selected based at least in part on the one or more communication parameters. Additionally, or alternatively, the communication manager 140 may perform one or more other operations described herein.

Figure 2:
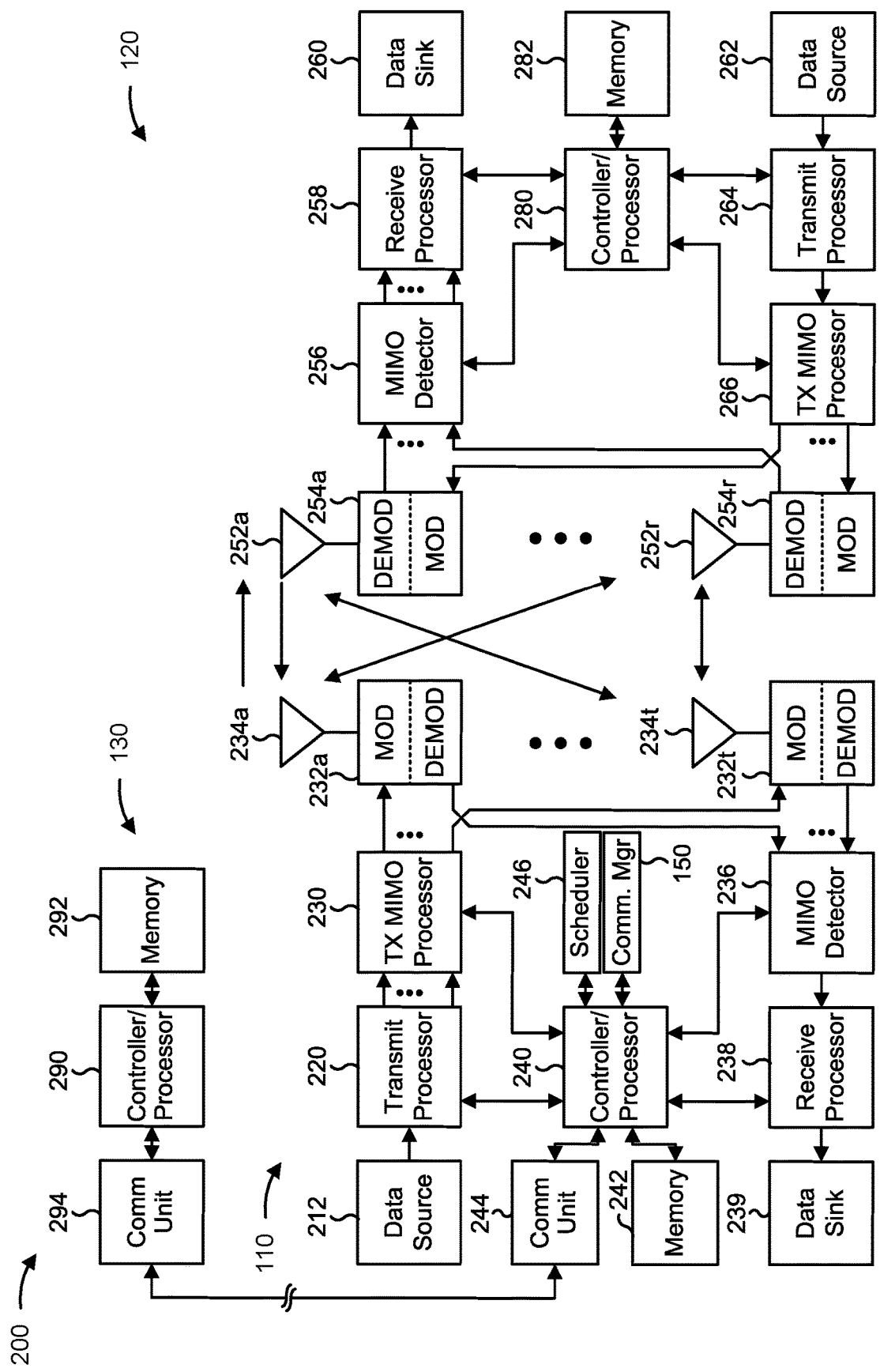
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein.

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with a cross link interference (CLI) measurement resource indication, as described in more detail elsewhere herein. For example, the controller/processor 240 of the network node 110, the controller/processor 280 of the UE 120, or any other component(s) (or combinations of components) of FIG. 2 may perform or direct operations of, for example, process 700 of FIG. 7 or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 700 of FIG. 7 or other processes as described herein. In some examples, executing instructions may include running the instructions, converting the instructions, compiling the instructions, or interpreting the instructions.

In some aspects, the UE includes means for obtaining one or more communication parameters associated with one or more communications to be transmitted by the UE; and/or means for transmitting the one or more communications based at least in part on a congestion control algorithm selected from a set of candidate congestion control algorithms, the congestion control algorithm selected based at least in part on the one or more communication parameters. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

Figure 3:
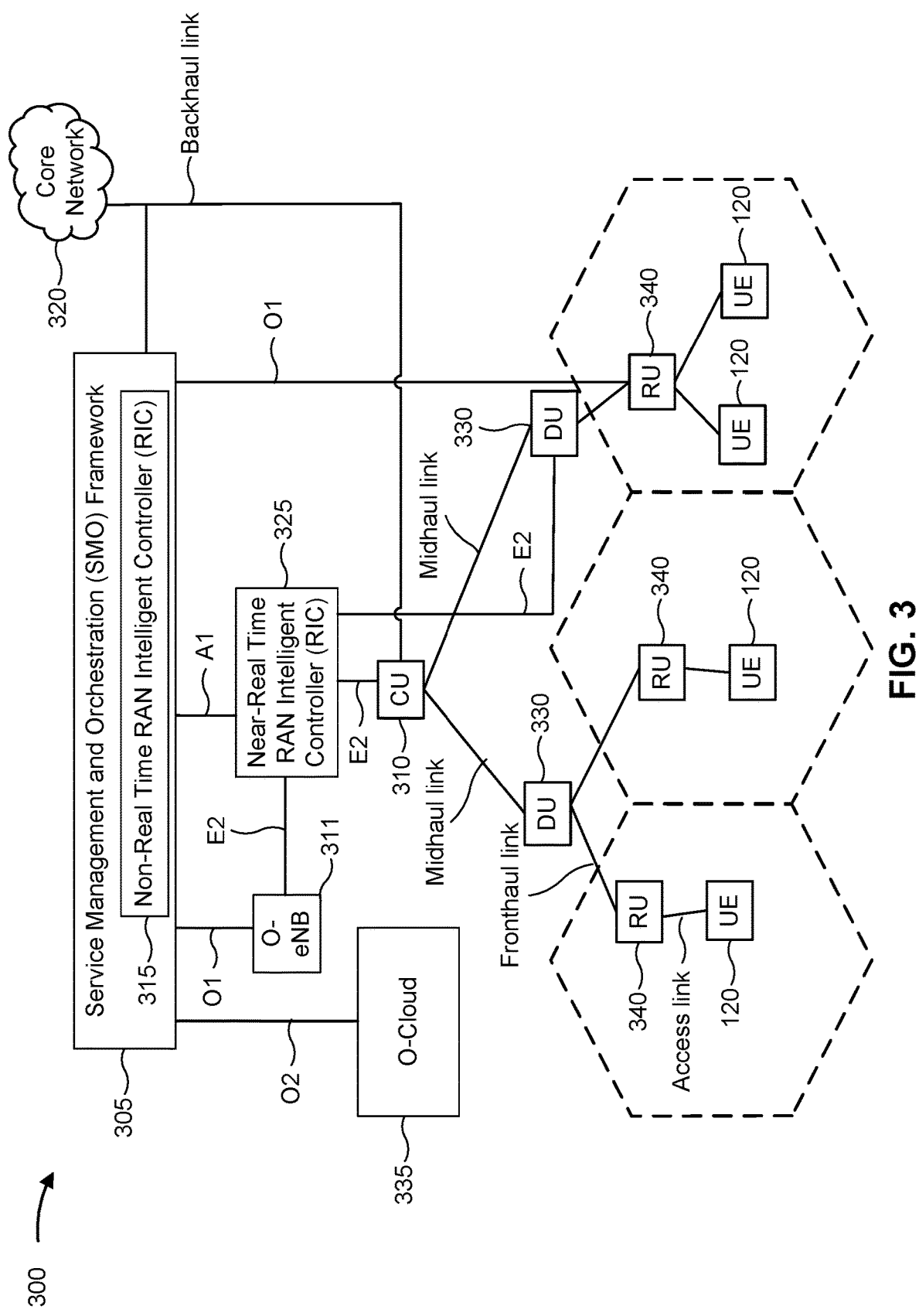
FIG. 3 is a diagram illustrating an example disaggregated base station architecture.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 335) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
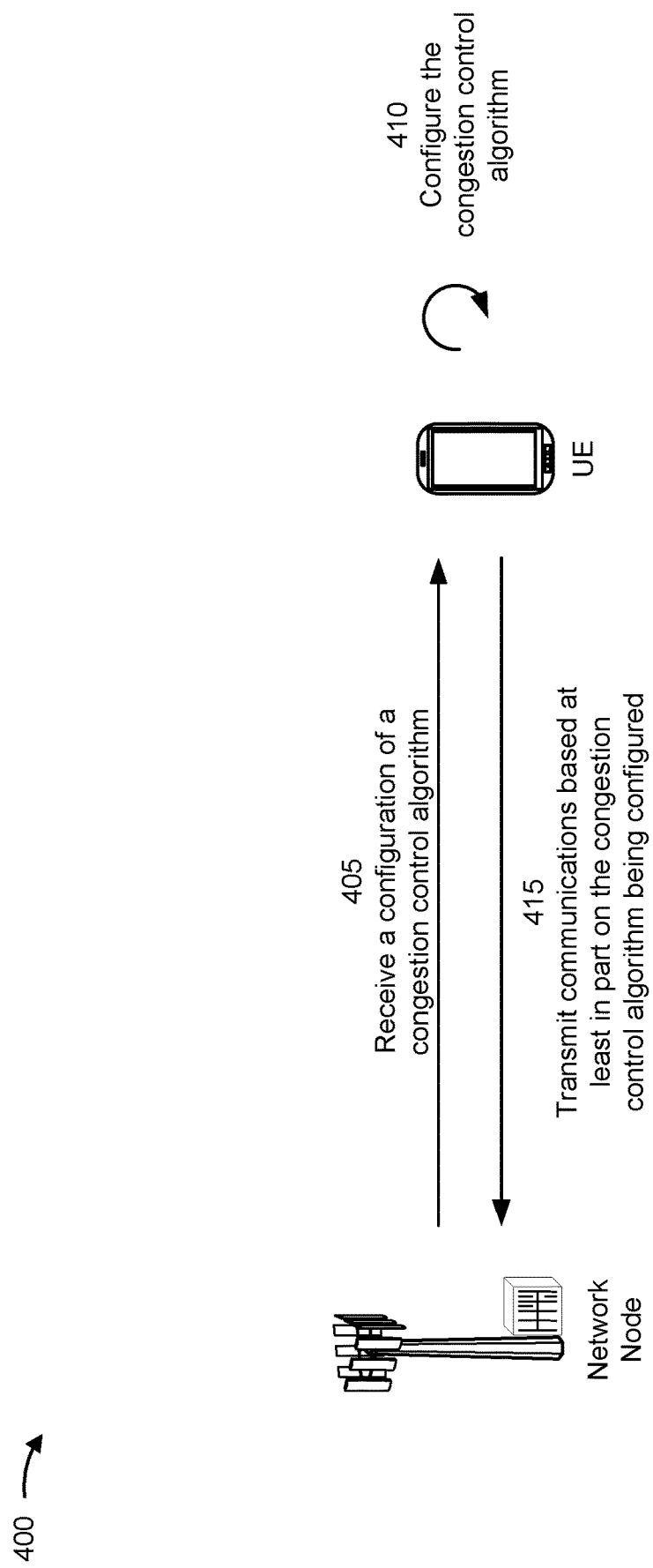
FIG. 4 is a diagram illustrating an example of using a congestion control algorithm in a wireless network.

FIG. 4 is a diagram illustrating an example 400 of using a congestion control algorithm in a wireless network. As shown in FIG. 4, a UE and a network node may communicate via a wireless network. The network node may be associated with a core network that connects the UE to an application server with which the UE communicates. The network node may include, or may be included in, a base station 110, a CU, a DU an RU, a wireless router, a wired router, a local area network node, a wide area network node, and/or a non-telecommunications-based node, among other examples. The core network may route communications from multiple UEs and/or other devices through the core network to any number of application servers. The core network may become congested with communications, which may delay routing and increase a round-trip time (RTT) for communications between the UE and the network node.

In some networks, the UE may be configured with a congestion control algorithm. For example, as shown by reference number 405, the UE may receive a configuration of the congestion control algorithm from the network node. As shown by reference number 410, the UE may configure the congestion control algorithm for communicating with the network node. In some networks, the UE may be configured with the congestion control algorithm based at least in part on receiving the configuration from the network node and/or based at least in part on a communication protocol.

As shown by reference number 415, the UE may transmit communications based at least in part on the congestion control algorithm being configured. Based at least in part on using the congestion control algorithm, the UE may communicate with a configuration that improves communication via the network based at least in part on adapting for congestion.

In some networks, the UE may be configured to apply a cubic congestion control algorithm. As used herein, cubic congestion control algorithms may refer to any algorithm that controls traffic that reduces network congestion based on packet loss events. For example, the cubic congestion control may use a cubic function to ramp up bandwidth of the network between congestions events. In this way, the cubic function may spend most time in a high-bandwidth period, but may incur latency after congestion events as the bandwidth increases again. The cubic congestion control algorithm may improve throughput of communications. However, the cubic congestion control algorithm may increase bufferbloat, leading to increased delay, may cause the UE to unnecessarily back off transmissions, and/or may assume that any transmission failure is congestion-related (e.g., even if a wireless link-related loss would be temporary).

In some networks, the UE may be configured with a bottleneck bandwidth and round-trip propagation time (BBR) congestion control algorithm. As used herein, BBR may refer to any algorithm that controls traffic based at least in part on measured or predicted delays (e.g., round-trip propagation times) within the network. In comparison with a cubic congestion control algorithm, the BBR congestion control algorithm may improve delay (e.g., latency), but may decrease throughput under some conditions.

Other congestion control algorithms may be configurable for the UE, with each congestion control algorithm having different advantages and disadvantages. However, the UE may be configured with only one congestion control algorithm to use during a connection with the network node and/or with only one congestion control algorithm to use for communicating via a transmission control protocol (TCP) connection.

As indicated above, FIG. 4 is provided as an example. Other examples may differ from what is described with regard to FIG. 4.

In some aspects described herein, a UE may identify regimes on which TCP cubic or TCP BBR improve communication efficiency (e.g., throughput and/or delay, among other examples). For example, the UE may use a machine learning (ML) model (e.g., a decision tree, an ensemble model, a neural network model, or a reinforcement learning model, among other examples), to identify a congestion control algorithm to apply based at least in part on one or more communication parameters associated with one or more communications to be transmitted by the UE.

The UE may obtain the one or more communication parameters based at least in part on a configuration indicated from the network node, measurements made by the UE, feedback on previous communications, and/or other indications from the network node, among other examples. The UE may select the congestion control algorithm based at least in part on the one or more communication parameters transmit the one or more communications based at least in part on the congestion control algorithm.

In some aspects, the UE may select the congestion control algorithm (e.g., switch to the congestion control algorithm) at a start of a TCP connection. In some aspects, the UE may select the congestion control algorithm midway through the TCP connection (e.g., after beginning to communicate via the TCP connection).

In some aspects, the UE may provide an indication of the congestion control algorithm to an application client associated with the TCP connection. In this way, the application client may generate data based at least in part on the congestion control algorithm to improve throughput and/or delay of communications for transmission.

In some aspects, the ML model may be a decision tree (e.g., basic decision tree, XGBoost, or random forest, among other examples). The decision tree may receive one or more inputs, such as loss rate (e.g., a mean), 95th percentile RTT, minimum RTT, bandwidth-delay product (e.g., a mean), bottleneck bandwidth (e.g., a mean and/or a standard deviation), rate-percentile differences (e.g., 90th-10th) over different windows (e.g., a mean over widows in a range of [0.5 s, 4 s]).

The ML model may output a selection of a congestion control algorithm that optimizes a metric for communications. In some aspects, the output may indicate a first congestion control algorithm having a first throughput and a second congestion control algorithm having a second throughput. In some aspects, the ML model may optimize for throughput based at least in part on the first throughput and the second throughput having a difference that satisfies a threshold (e.g., throughput(BBR)/throughput(CUBIC) >±5% tolerance). If the difference fails to satisfy the threshold, the ML model may optimize for a combination of throughput and RTT (e.g., throughput/RTT).

In some aspects, the ML model may indicate to continue using a current congestion control algorithm. In some aspects, the ML model may indicate to switch to a different congestion control algorithm. In some aspects, the ML model may indicate that a first congestion control algorithm and a second congestion control algorithm are substantially equivalent. For example, if throughput of a first congestion control algorithm (e.g., BBR)/a second congestion control algorithm (e.g., cubic)<±5% tolerance, the first congestion control algorithm and the second congestion control algorithm may be considered substantially equivalent. The ML model may indicate to switch from a current congestion control algorithm based at least in part on an additional congestion control algorithm improving a communication metric (e.g., throughput and/or RTT) by an amount that satisfies a threshold, when compared with the current congestion control algorithm. In this way, the ML model may avoid indicating to switch between congestion control algorithms (e.g., ping-ponging) when minimal gains are expected by switching.

Based at least in part on the UE being configured to select congestion control algorithms based at least in part on one or more communication parameters, the UE may optimize congestion control algorithms for communicating in difference scenarios. In this way, the UE may improve communication throughput, reduce dropped packets (e.g., when a buffer is full), and/or reduce delay for communications between the UE and the network node, among other examples.

Figure 5:
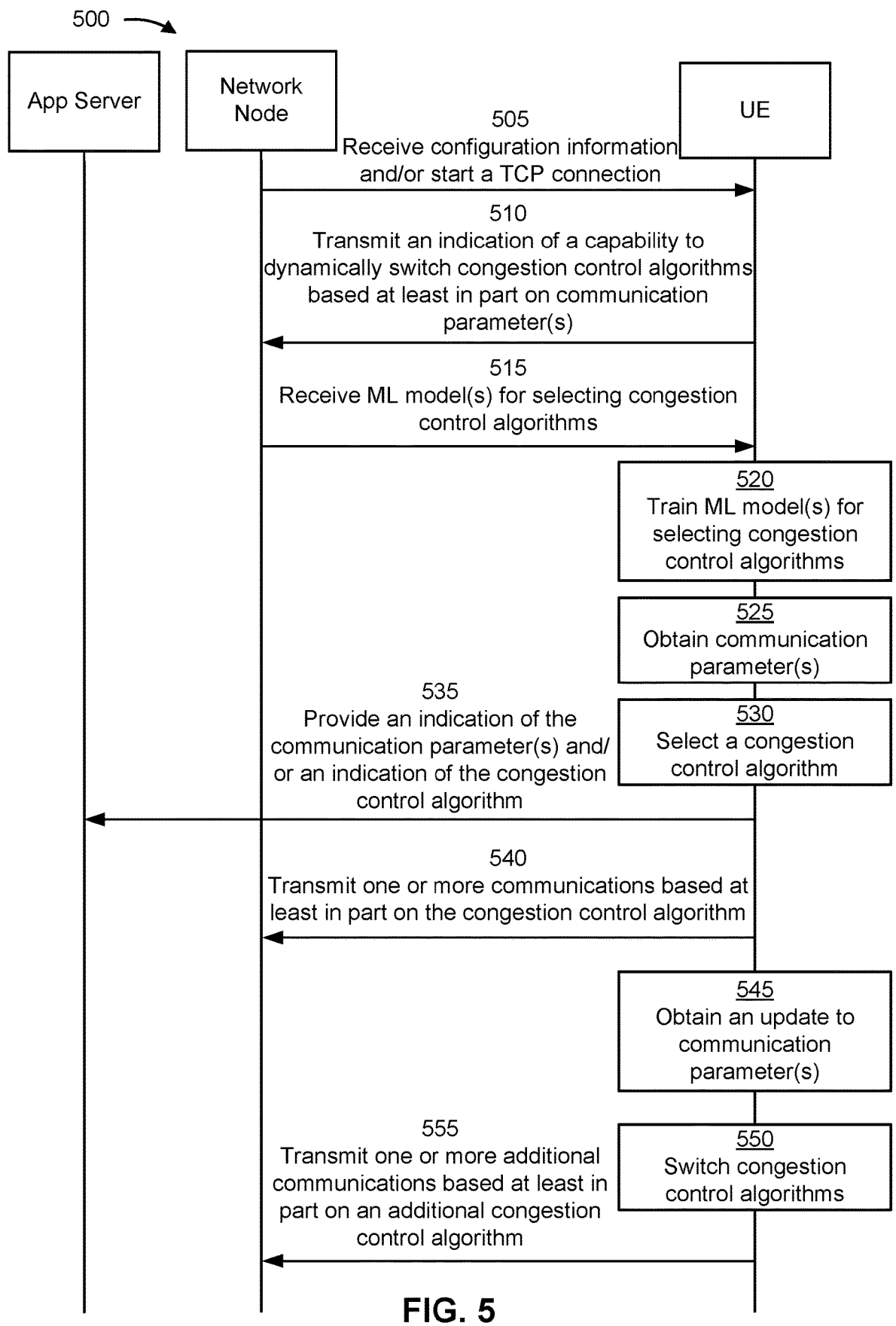
FIG. 5-6 are diagrams illustrating examples associated with congestion control algorithms, in accordance with the present disclosure.

FIG. 5 is a diagram of an example 500 associated with congestion control algorithms, in accordance with the present disclosure. As shown in FIG. 5, a network node (e.g., base station 110, a CU, a DU an RU, a wireless router, a wired router, a local area network node, a wide area network node, and/or a non-telecommunications-based node) may communicate with a UE (e.g., UE 120). In some aspects, the network node and the UE may be part of a wireless network (e.g., wireless network 100). The UE and the network node may have established a wireless connection prior to operations shown in FIG. 5. In some aspects, the UE may communicate with an application (App) server via the network node and/or a core network associated with the network node.

As shown by reference number 505, the network node may transmit, and the UE may receive, configuration information and/or start a TCP connection. In some aspects, the UE may receive the configuration information via one or more of RRC signaling, one or more medium access control (MAC) control elements (CEs), and/or downlink control information (DCI), among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to select a congestion control algorithm for one or more communications based at least in part on one or more communication parameters. In some aspects, the configuration information may indicate that the UE is to select the congestion control algorithm using an ML model (e.g., provided by the network node or trained by the UE, among other examples). In some aspects, the configuration information may provide a configuration for subsequent communications, with the configuration indicating one or more communication parameters associated with selecting the congestion control algorithm.

The UE may configure itself based at least in part on the configuration information. In some aspects, the UE may be configured to perform one or more operations described herein based at least in part on the configuration information.

In some aspects, the UE and the network node may start a TCP connection. In some aspects, the TCP connection may be associated with an application client on the UE and an application associated with the application server. In some aspects, the TCP connection may indicate parameters for the UE to use for transmitting one or more communications to the network node.

As shown by reference number 510, the UE may transmit, and the network node may receive, an indication of a capability to dynamically switch congestion control algorithms based at least in part on one or more communication parameters. For example, the UE may transmit an indication of a capability to dynamically switch (e.g., based at least in part on a determination at the UE and not solely based at least in part on a configuration from the network node) congestion control algorithms at a start of a connection (e.g., a TCP connection) or during a connection (e.g., after transmitting or receiving communications via the connection).

As shown by reference number 515, the UE may receive, and the network node may transmit, one or more ML models for selecting congestion control algorithms. For example, the network node may train the one or more ML models or may receive the one or more ML models from another device (e.g., an additional network node, such as a core network (CN) network node) and may provide the one or more ML models for the UE to use.

As shown by reference number 520, the UE may train one or more ML models for selecting congestion control algorithms. In some aspects, the UE may train the one or more ML models using one or more communication parameters and performance metrics, such as throughput or RTT, from past communications. The UE may train the model to predict which congestion control algorithm will optimize a performance metric, such as throughput or RTT, based at least in part on one or more communication parameters associated with a current connection.

In some aspects, the one or more ML models include a decision tree, an ensemble ML model, a neural network model, or a reinforcement learning mode, among other examples. In some aspects, the UE may train multiple ML models and select an ML model for use based at least in part on accuracy of predictions and/or selections from the multiple ML models.

As shown by reference number 525, the UE may obtain one or more communication parameters. In some aspects, the UE may obtain the one or more communication parameters based at least in part on measuring one or more metrics of the one or more communications, an updated configuration indicated from the network node, feedback on previous communications, an update to an application client associated with the one or more communications, and/or other indications from the network node, among other examples.

In some aspects, the one or more communication parameters may include metrics associated with throughput and/or RTT of the one or more communications. For example, the one or more communication metrics may include channel conditions, historical data associated with congestion control using the congestion control algorithm with the one or more communication parameters, a currently applied congestion control algorithm, bottleneck link rate statistics, delay statistics, RTT statistics, an OTA link rate estimate, among other examples. In some aspects, the one or more communication metrics may include an application preference (e.g., a preference associated with an application and/or a dynamic preference that is based at least in part on a current use and/or state of the application client, among other examples), network information, and/or a time series of one or more of bandwidth, delay, or loss (e.g., packet loss and/or dropped packets, among other examples). In some aspects, the one or more communication metrics may include a loss rate, a percentile value of RTT, a minimum RTT, a bandwidth-delay product, a bottleneck bandwidth, and/or a rate-percentile difference for different windows, among other examples.

As shown by reference number 530, the UE may select a congestion control algorithm. For example, the UE may select the congestion control algorithm based at least in part on the one or more communication parameters. In some aspects, the UE may use an ML model, such as an ML model trained by the UE or an ML model received from the network node, to select the congestion control algorithm based at least in part on the one or more communication parameters.

In some aspects, the ML model may select the congestion control algorithm based at least in part on the congestion control algorithm being expected to optimize throughput and/or RTT relative to one or more other congestion control algorithms of a set of candidate congestion control algorithms. In some aspects, the ML model may select the congestion control algorithm based at least in part on the congestion control algorithm optimizing first performance indicator (e.g., throughput) with an improvement over other congestion control algorithms by an amount that satisfies a threshold. In some aspects, the ML model may select the congestion control algorithm based at least in part on the congestion control algorithm optimizing a second performance indicator (e.g., RTT) based at least in part on the congestion control algorithm optimizing the first performance indicator with an improvement by an amount that fails to satisfy the threshold. In some aspects, the ML model may select the congestion control algorithm based at least in part on the congestion control algorithm optimizing a combination of the first performance indicator and the second performance indicator (e.g., with different priorities and/or weights).

In some aspects, the UE may select the congestion control algorithm from the set of candidate congestion control algorithms based at least in part on providing the one or more communication parameters as inputs to an ML model. In some aspects, the UE may be configured with the set of candidate congestion control algorithms via a communication from the network node and/or via a communication protocol, among other examples.

In some aspects, the congestion control algorithm includes a TCP congestion control algorithm. For example, the congestion control algorithm may include a cubic congestion control algorithm (e.g., a TCP cubic congestion control algorithm) or a BBR congestion control algorithm (e.g., a TCP BBR congestion control algorithm), among other examples.

In some aspects, the UE may select the congestion control algorithm at a start of a TCP connection. In some aspects, the UE may select the congestion control algorithm after transmitting or receiving communications via the TCP connection (e.g., during the TCP connection).

In some aspects, the UE may provide, to an application client at the UE, an indication of the one or more communication parameters or an indication of a recommendation to use the congestion control algorithm. In this way, the application client may generate data for transmission based at least in part on the congestion control algorithm. In some aspects, the UE may receive, from the application client, an indication to use the congestion control algorithm for transmitting the one or more communications generated at the application client. In some aspects, the application client comprises an application operating on the UE. Indications from the UE to the application client may be cross-layer communications, with the application client operating in an application layer and one or more portions of the UE (e.g., a modem) operating at a physical layer.

As shown by reference number 535, the UE may provide, and the application server may receive via the network node, an indication of the one or more communication parameters and/or an indication of the congestion control algorithm. In this way, the application server may be prepared to receive communications from the UE based at least in part on a type of congestion control algorithm used by the UE. In some aspects, the UE may receive, from the application server, an indication to use the congestion control algorithm for transmitting the one or more communications generated at the application client.

As shown by reference number 540, the UE may transmit, and the network node may receive, one or more communications based at least in part on the congestion control algorithm. The network node may provide the one or more communications to the application server via a network associated with the network node. In some aspects, the network node and the application server may be co-located.

As shown by reference number 545, the UE may obtain an update to the one or more communication parameters. In some aspects, the UE may obtain the update based at least in part on measuring one or more metrics of the one or more communications, an updated configuration indicated from the network node, feedback on previous communications, an update to an application client associated with the one or more communications, and/or other indications from the network node, among other examples.

As shown by reference number 550, the UE may switch congestion control algorithms. For example, the UE may use a first congestion control algorithm for the one or more communications and may use a second congestion control algorithm for one or more additional communications transmitted subsequent to switching. In some aspects, the first congestion control algorithm may be a first congestion control algorithm type that is different from a second congestion control algorithm type of the congestion control algorithm used to transmit the one or more communications.

In some aspects, the UE may switch congestion control algorithms to the second congestion control algorithm based at least in part on one or more first performance indicators associated with the second congestion control algorithm being an improvement, by a threshold amount (e.g., an amount that satisfies a threshold), compared to one or more second performance indicators associated with the first congestion control algorithm. In some aspects, the threshold amount may be configured based at least in part on the UE, the application client, an indication from the network node, and/or a communication protocol, among other examples.

As shown by reference number 555, the UE may transmit one or more additional communications based at least in part on an additional congestion control algorithm. For example, the UE may transmit the one or more communications using a congestion control algorithm that is optimized for a performance indicator based at least in part on the updated communication parameters.

Based at least in part on the UE being configured to select congestion control algorithms based at least in part on one or more communication parameters, the UE may optimize congestion control algorithms for communicating in difference scenarios. In this way, the UE may improve communication throughput, reduce dropped packets (e.g., when a buffer is full), and/or reduce delay for communications between the UE and the network node, among other examples.

As indicated above, FIG. 5 is provided as an example. Other examples may differ from what is described with respect to FIG. 5.

Figure 6:
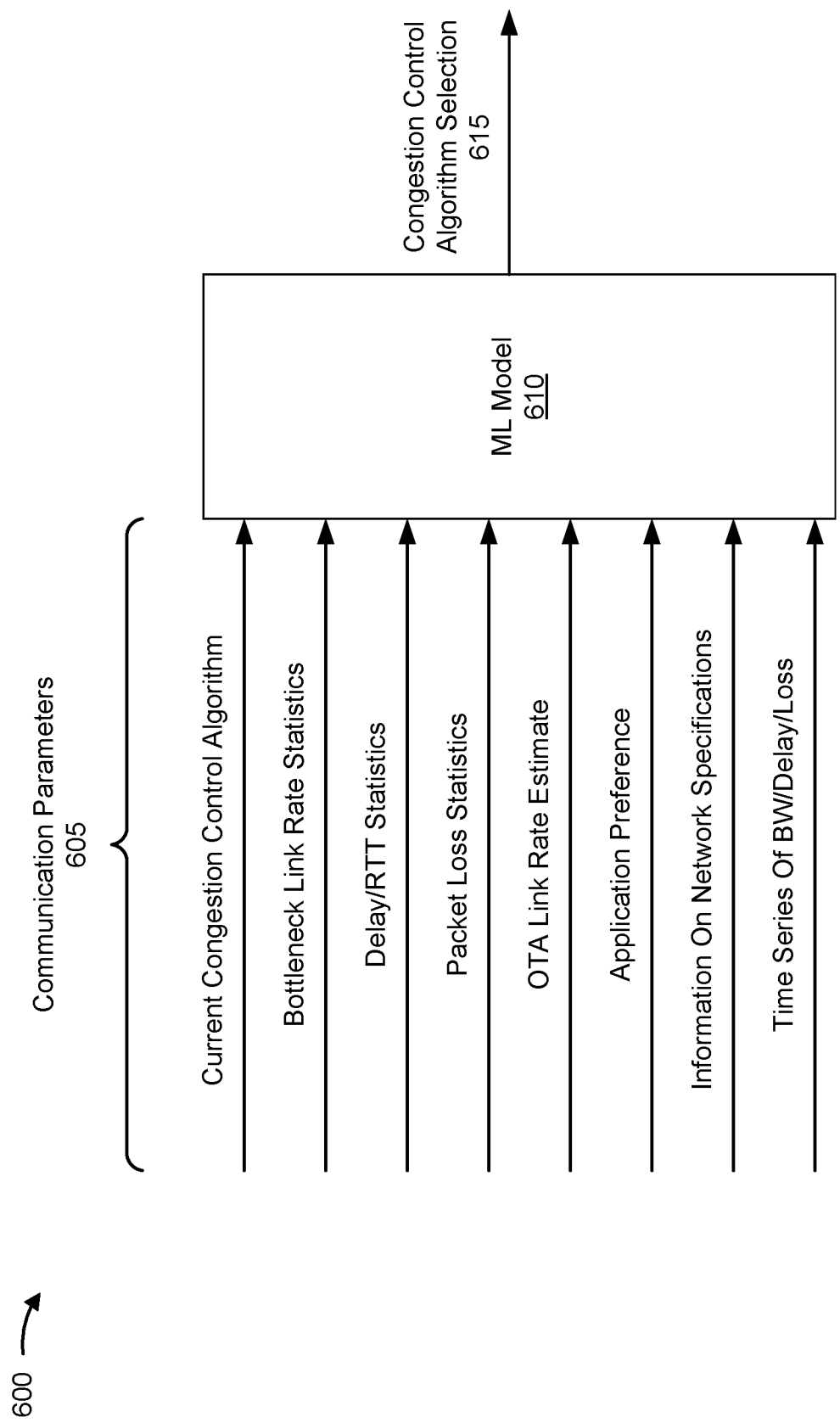

FIG. 6 is a diagram of an example 600 associated with congestion control algorithms, in accordance with the present disclosure. In connection with FIG. 6, a network node (e.g., base station 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 6. The UE may select a congestion control algorithm for transmitting communications associated with an application client to the network node.

The UE may provide one or more communication parameters 605 to an ML model 610 for selecting a congestion control algorithm to apply to one or more subsequent communications. As shown in FIG. 6, the one or more communication parameters 605 may include a currently applied congestion control algorithm, bottleneck link rate statistics, delay statistics, delay and/or RTT statistics, packet loss statistics, an OTA link rate estimate, an application preference, information on network specifications, and/or one or more time series of bandwidth (BW) delay and/or loss, among other examples. In some aspects, the one or more communication parameters 605 may include additional and/or alternative metrics, such as a loss rate, a percentile value of RTT, a minimum RTT, a bandwidth-delay product, a bottleneck bandwidth, and/or a rate-percentile difference for different windows, among other examples.

The ML model 610 may use the one or more communication parameters 605 to output a congestion control algorithm selection 615. The congestion control algorithm selection 615 may optimize communications (e.g., transmissions) based at least in part on the communication parameters 605. In some aspects, the congestion control algorithm selection 615 may optimize one or more performance indicators of the communications, such as throughput or RTT, among other examples.

As indicated above, FIG. 6 is provided as an example. Other examples may differ from what is described with respect to FIG. 6.

Figure 7:
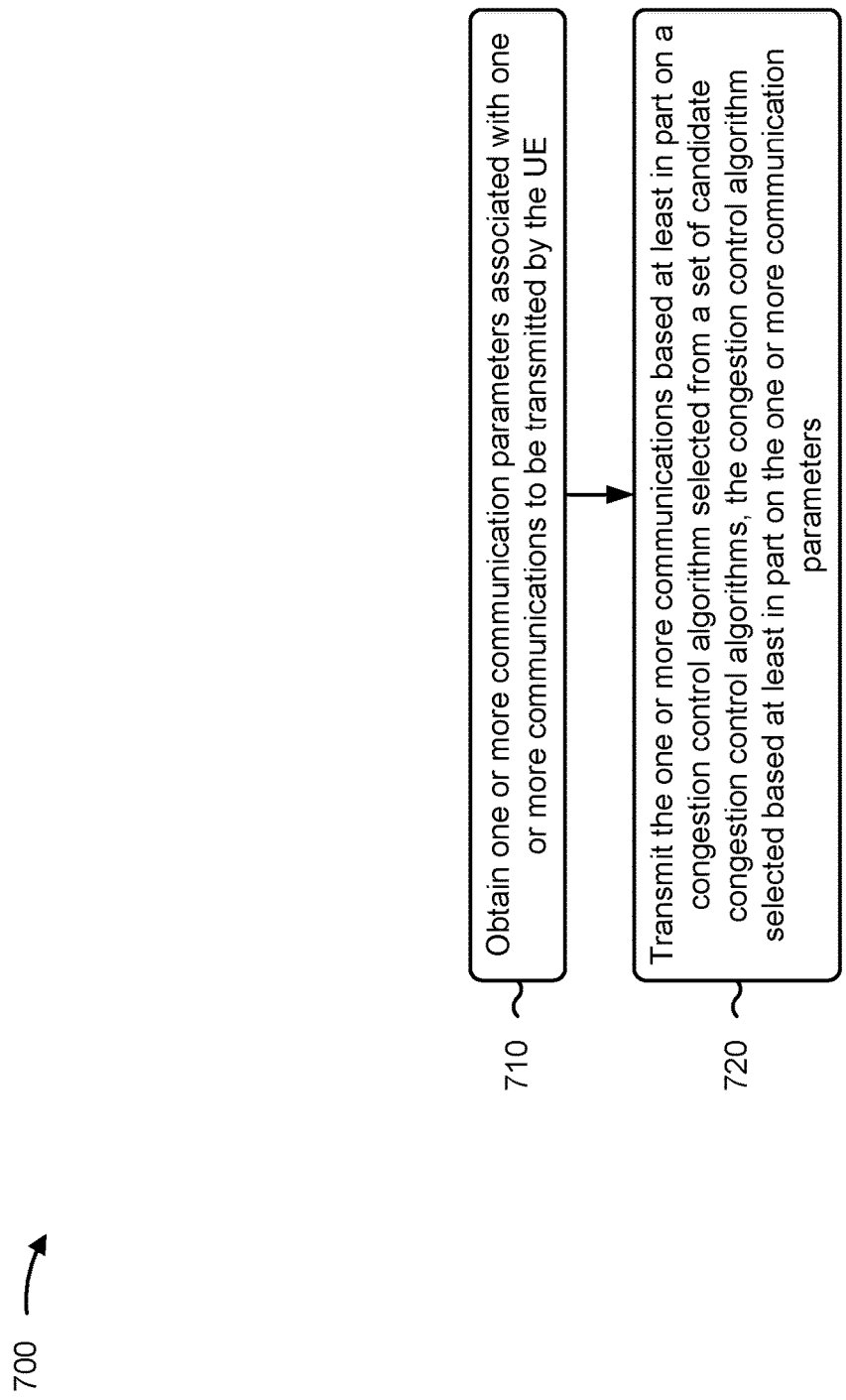
FIG. 7 is a diagram illustrating an example process associated with congestion control algorithms, in accordance with the present disclosure.

FIG. 7 is a diagram illustrating an example process 700 performed, for example, by a UE, in accordance with the present disclosure. Example process 700 is an example where the UE (e.g., UE 120) performs operations associated with congestion control algorithms.

As shown in FIG. 7, in some aspects, process 700 may include obtaining one or more communication parameters associated with one or more communications to be transmitted by the UE (block 710). For example, the UE (e.g., using communication manager 140, communication manager 808, and/or reception component 802, depicted in FIG. 8) may obtain one or more communication parameters associated with one or more communications to be transmitted by the UE, as described above.

As further shown in FIG. 7, in some aspects, process 700 may include transmitting the one or more communications based at least in part on a congestion control algorithm selected from a set of candidate congestion control algorithms, the congestion control algorithm selected based at least in part on the one or more communication parameters (block 720). For example, the UE (e.g., using communication manager 140 and/or transmission component 804, depicted in FIG. 8) may transmit the one or more communications based at least in part on a congestion control algorithm selected from a set of candidate congestion control algorithms, the congestion control algorithm selected based at least in part on the one or more communication parameters, as described above.

Process 700 may include additional aspects, such as any single aspect or any combination of aspects described below and/or in connection with one or more other processes described elsewhere herein.

In a first aspect, process 700 includes selecting the congestion control algorithm from the set of candidate congestion control algorithms based at least in part on providing the one or more communication parameters as inputs to a machine learning model.

In a second aspect, alone or in combination with the first aspect, the machine learning model comprises a decision tree, an ensemble machine learning model, a neural network model, or a reinforcement learning mode.

In a third aspect, alone or in combination with one or more of the first and second aspects, the congestion control algorithm comprises one or more of a transmission control protocol congestion control algorithm, a cubic congestion control algorithm, or a BBR congestion control algorithm.

In a fourth aspect, alone or in combination with one or more of the first through third aspects, process 700 includes obtaining an update to the one or more communication parameters, and transmitting one or more additional communications based at least in part on an additional congestion control algorithm that is a first congestion control algorithm type that is different from a second congestion control algorithm type of the congestion control algorithm.

In a fifth aspect, alone or in combination with one or more of the first through fourth aspects, process 700 includes selecting the congestion control algorithm at a start of a TCP connection, or selecting the congestion control algorithm after transmitting or receiving communications via the TCP connection.

In a sixth aspect, alone or in combination with one or more of the first through fifth aspects, process 700 includes providing, to an application client associated with the one or more communications, an indication of one or more of the one or more communication parameters, or an indication of a recommendation to use the congestion control algorithm, and receiving an indication to use the congestion control algorithm.

In a seventh aspect, alone or in combination with one or more of the first through sixth aspects, process 700 includes providing, to an application server associated with the one or more communications, an indication of one or more of the one or more communication parameters, or an indication of a recommendation to use the congestion control algorithm, and receiving an indication to use the congestion control algorithm.

In an eighth aspect, alone or in combination with one or more of the first through seventh aspects, the one or more communication parameters comprise one or more of channeling conditions, historical data associated with congestion control using the congestion control algorithm with the one or more communication parameters, a currently applied congestion control algorithm, bottleneck link rate statistics, delaying statistics, RTT statistics, an OTA link rate estimate, an application preference, network information, or a time series of one or more of bandwidth, delay, or loss.

In a ninth aspect, alone or in combination with one or more of the first through eighth aspects, the one or more communication parameters comprise one or more of a loss rate, a percentile value of RTT, a minimum RTT, a bandwidth-delay product, a bottleneck bandwidth, or a rate-percentile difference for different windows.

In a tenth aspect, alone or in combination with one or more of the first through ninth aspects, selection of the congestion control algorithm from the set of congestion control algorithms is based at least in part on the congestion control algorithm being expected to optimize, relative to one or more other congestion control algorithms of the set of congestion control algorithms, one or more of throughput or RTT.

In an eleventh aspect, alone or in combination with one or more of the first through tenth aspects, process 700 includes selecting an additional congestion control algorithm for one or more additional communications based at least in part on one or more first performance indicators associated with the additional congestion control algorithm being an improvement, by a threshold amount, compared to one or more second performance indicators associated with the congestion control algorithm.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
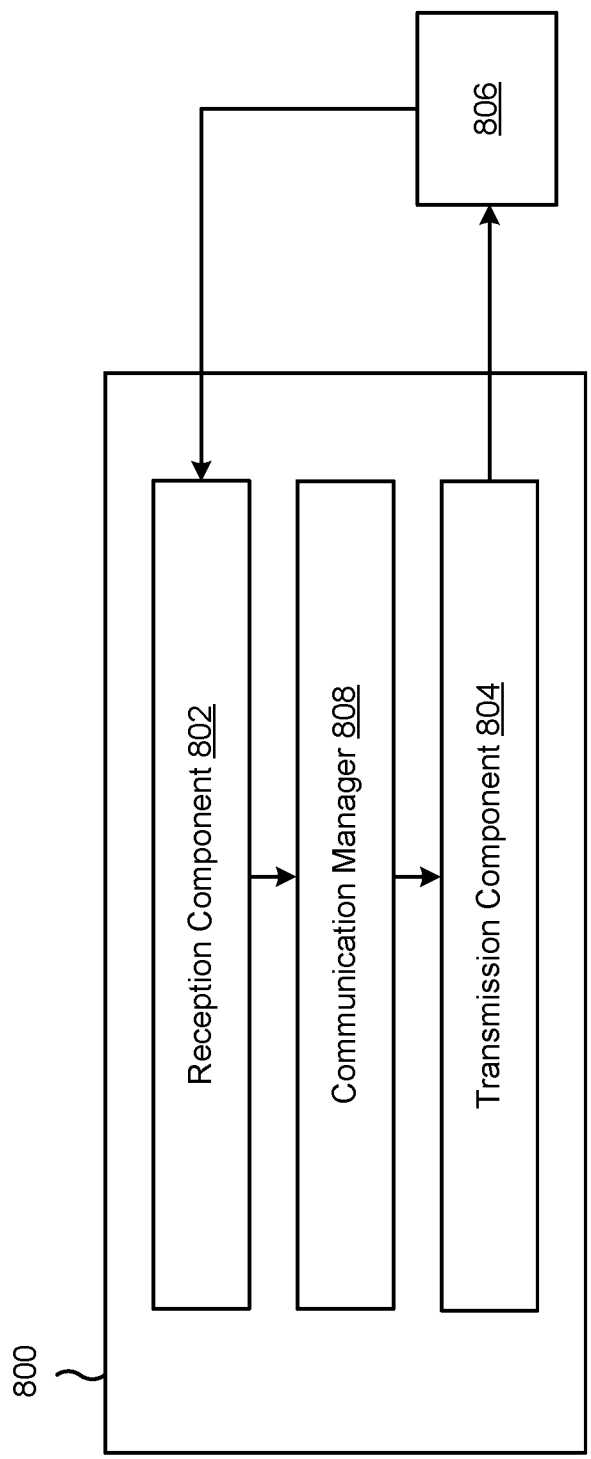
FIG. 8 is a diagram of an example apparatus for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808 (e.g., the communication manager 140).

In some aspects, the apparatus 800 may be configured to perform one or more operations described herein in connection with FIG. 5-6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The communication manager 808 and/or the reception component 802 may obtain one or more communication parameters associated with one or more communications to be transmitted by the UE. The transmission component 804 may transmit the one or more communications based at least in part on a congestion control algorithm selected from a set of candidate congestion control algorithms, the congestion control algorithm selected based at least in part on the one or more communication parameters.

The communication manager 808 may select the congestion control algorithm from the set of candidate congestion control algorithms based at least in part on providing the one or more communication parameters as inputs to a machine learning model.

The communication manager 808 and/or the reception component 802 may obtain an update to the one or more communication parameters.

The transmission component 804 may transmit one or more additional communications based at least in part on an additional congestion control algorithm that is a first congestion control algorithm type that is different from a second congestion control algorithm type of the congestion control algorithm.

The communication manager 808 may select the congestion control algorithm at a start of a TCP connection.

The communication manager 808 may select the congestion control algorithm after transmitting or receiving communications via the TCP connection.

The communication manager 808 may provide, to an application client associated with the one or more communications, an indication of one or more of the one or more communication parameters, or an indication of a recommendation to use the congestion control algorithm.

The reception component 802 may receive an indication to use the congestion control algorithm.

The communication manager 808 and/or the transmission component 804 may provide, to an application server associated with the one or more communications, an indication of one or more of the one or more communication parameters, or an indication of a recommendation to use the congestion control algorithm.

The reception component 802 may receive an indication to use the congestion control algorithm.

The communication manager 808 may select an additional congestion control algorithm for one or more additional communications based at least in part on one or more first performance indicators associated with the additional congestion control algorithm being an improvement compared to one or more second performance indicators associated with the congestion control algorithm.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: obtaining one or more communication parameters associated with one or more communications to be transmitted by the UE; and transmitting the one or more communications based at least in part on a congestion control algorithm selected from a set of candidate congestion control algorithms, the congestion control algorithm selected based at least in part on the one or more communication parameters.

Aspect 2: The method of Aspect 1, further comprising: selecting the congestion control algorithm from the set of candidate congestion control algorithms based at least in part on providing the one or more communication parameters as inputs to a machine learning model.

Aspect 3: The method of Aspect 2, wherein the machine learning model comprises a decision tree, an ensemble machine learning model, a neural network model, or a reinforcement learning mode.

Aspect 4: The method of any of Aspects 1-3, wherein the congestion control algorithm comprises one or more of: a transmission control protocol congestion control algorithm, a cubic congestion control algorithm, or a bottleneck bandwidth and round-trip propagation time (BBR) congestion control algorithm.

Aspect 5: The method of any of Aspects 1-4, further comprising: obtaining an update to the one or more communication parameters, and transmitting one or more additional communications based at least in part on an additional congestion control algorithm that is a first congestion control algorithm type that is different from a second congestion control algorithm type of the congestion control algorithm.

Aspect 6: The method of any of Aspects 1-5, further comprising: selecting the congestion control algorithm at a start of a transmission control protocol (TCP) connection, or selecting the congestion control algorithm after transmitting or receiving communications via the TCP connection.

Aspect 7: The method of any of Aspects 1-6, further comprising: providing, to an application client associated with the one or more communications, an indication of one or more of: the one or more communication parameters, or an indication of a recommendation to use the congestion control algorithm; and receiving an indication to use the congestion control algorithm.

Aspect 8: The method of any of Aspects 1-7, further comprising: providing, to an application server associated with the one or more communications, an indication of one or more of: the one or more communication parameters, or an indication of a recommendation to use the congestion control algorithm; and receiving an indication to use the congestion control algorithm.

Aspect 9: The method of any of Aspects 1-8, wherein the one or more communication parameters comprise one or more of: channel conditions, historical data associated with congestion control using the congestion control algorithm with the one or more communication parameters, a currently applied congestion control algorithm, bottleneck link rate statistics, delay statistics, round-trip time (RTT) statistics, an over-the-air (OTA) link rate estimate, an application preference, network information, or a time series of one or more of bandwidth, delay, or loss.

Aspect 10: The method of any of Aspects 1-9, wherein the one or more communication parameters comprise one or more of: a loss rate, a percentile value of round-trip time (RTT), a minimum RTT, a bandwidth-delay product, a bottleneck bandwidth, or a rate-percentile difference for different windows.

Aspect 11: The method of any of Aspects 1-10, wherein selection of the congestion control algorithm from the set of congestion control algorithms is based at least in part on the congestion control algorithm being expected to optimize, relative to one or more other congestion control algorithms of the set of congestion control algorithms, one or more of throughput or round-trip time (RTT).

Aspect 12: The method of any of Aspects 1-11, further comprising: selecting an additional congestion control algorithm for one or more additional communications based at least in part on one or more first performance indicators associated with the additional congestion control algorithm being an improvement, by a threshold amount, compared to one or more second performance indicators associated with the congestion control algorithm.

Aspect 13: An apparatus for wireless communication at a device, comprising a processor; memory coupled with the processor; and instructions stored in the memory and executable by the processor to cause the apparatus to perform the method of one or more of Aspects 1-12.

Aspect 14: A device for wireless communication, comprising a memory and one or more processors coupled to the memory, the one or more processors configured to perform the method of one or more of Aspects 1-12.

Aspect 15: An apparatus for wireless communication, comprising at least one means for performing the method of one or more of Aspects 1-12.

Aspect 16: A non-transitory computer-readable medium storing code for wireless communication, the code comprising instructions executable by a processor to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive one or more machine learning models for selection of congestion control algorithms;
      train the one or machine learning models for the selection of the congestion control algorithms;
      obtain one or more communication parameters associated with one or more communications to be transmitted by the UE;
      transmit the one or more communications using a first congestion control algorithm selected from a set of candidate congestion control algorithms using the one or more machine learning models, the first congestion control algorithm being selected based at least in part on the one or more communication parameters;
      obtain an update to the one or more communication parameters; and
      transmit one or more additional communications using a second congestion control algorithm, that is different from a first congestion control algorithm type, based at least in part on the update.

2. The UE of claim 1, wherein the one or more processors are further configured to:
   select the first congestion control algorithm from the set of candidate congestion control algorithms based at least in part on providing the one or more communication parameters as inputs to the one or more machine learning models.

3. The UE of claim 2, wherein the one or more machine learning models comprises a decision tree, an ensemble machine learning model, a neural network model, or a reinforcement learning mode.

4. The UE of claim 1, wherein the first congestion control algorithm comprises one or more of:
   a transmission control protocol congestion control algorithm,
   a cubic congestion control algorithm, or
   a bottleneck bandwidth and round-trip propagation time (BBR) congestion control algorithm.

5. The UE of claim 1, wherein the one or more processors are further configured to:
   select the first congestion control algorithm at a start of a transmission control protocol (TCP) connection, or
   select the first congestion control algorithm after transmitting or receiving communications via the TCP connection.

6. The UE of claim 1, wherein the one or more processors are further configured to:
   provide, to an application client associated with the one or more communications, an indication of one or more of:
      the one or more communication parameters, or
      a recommendation to use the first congestion control algorithm; and
   receive an indication to use the first congestion control algorithm.

7. The UE of claim 1, wherein the one or more processors are further configured to:

provide, to an application server associated with the one or more communications, an indication of one or more of:
the one or more communication parameters, or
a recommendation to use the first congestion control algorithm; and
receive an indication to use the first congestion control algorithm.

8. The UE of claim 1, wherein the one or more communication parameters comprise one or more of:
channel conditions,
historical data associated with congestion control using the first congestion control algorithm with the one or more communication parameters,
a currently applied congestion control algorithm,
bottleneck link rate statistics,
delay statistics,
round-trip time (RTT) statistics,
an over-the-air (OTA) link rate estimate,
an application preference,
network information, or
a time series of one or more of bandwidth, delay, or loss.

9. The UE of claim 1, wherein the one or more communication parameters comprise one or more of:
a loss rate,
a percentile value of round-trip time (RTT),
a minimum RTT,
a bandwidth-delay product,
a bottleneck bandwidth, or
a rate-percentile difference for different windows.

10. The UE of claim 1, wherein the selection of the first congestion control algorithm from the set of congestion control algorithms is based at least in part on the first congestion control algorithm being expected to optimize, relative to one or more other congestion control algorithms of the set of congestion control algorithms, one or more of throughput or round-trip time (RTT).

11. The UE of claim 1, wherein the one or more processors are further configured to:
select the second congestion control algorithm for the one or more additional communications based at least in part on one or more first performance indicators associated with the second congestion control algorithm being an improvement compared to one or more second performance indicators associated with the first congestion control algorithm.

12. A method of wireless communication performed by a user equipment (UE), comprising:
receiving one or more machine learning models for selecting congestion control algorithms;
training the one or machine learning models for selecting congestion control algorithms;
obtaining one or more communication parameters associated with one or more communications to be transmitted by the UE;
transmitting the one or more communications using a first congestion control algorithm selected from a set of candidate congestion control algorithms using the one or more machine learning models, the first congestion control algorithm being selected based at least in part on the one or more communication parameters;
obtaining an update to the one or more communication parameters; and
transmitting one or more additional communications using a second congestion control algorithm, that is different from a first congestion control algorithm type, based at least in part on the update.

13. The method of claim 12, further comprising:
selecting the first congestion control algorithm from the set of candidate congestion control algorithms based at least in part on providing the one or more communication parameters as inputs to the one or more machine learning models.

14. The method of claim 13, wherein the one or more machine learning models comprises:
a decision tree,
an ensemble machine learning model,
a neural network model, or
a reinforcement learning mode.

15. The method of claim 12, wherein the first congestion control algorithm comprises one or more of:
a transmission control protocol congestion control algorithm,
a cubic congestion control algorithm, or
a bottleneck bandwidth and round-trip propagation time (BBR) congestion control algorithm.

16. The method of claim 12, further comprising:
selecting the first congestion control algorithm at a start of a transmission control protocol (TCP) connection, or
selecting the first congestion control algorithm after transmitting or receiving communications via the TCP connection.

17. The method of claim 12, further comprising:
providing, to an application client associated with the one or more communications, an indication of one or more of:
the one or more communication parameters, or
a recommendation to use the first congestion control algorithm; and
receiving an indication to use the first congestion control algorithm.

18. The method of claim 12, further comprising:
providing, to an application server associated with the one or more communications, an indication of one or more of:
the one or more communication parameters, or
a recommendation to use the first congestion control algorithm; and
receiving an indication to use the first congestion control algorithm.

19. The method of claim 12, wherein the one or more communication parameters comprise one or more of:
channel conditions,
historical data associated with congestion control using the first congestion control algorithm with the one or more communication parameters,
a currently applied congestion control algorithm,
bottleneck link rate statistics,
delay statistics,
round-trip time (RTT) statistics,
an over-the-air (OTA) link rate estimate,
an application preference,
network information, or
a time series of one or more of bandwidth, delay, or loss.

20. The method of claim 12, wherein the one or more communication parameters comprise one or more of:
a loss rate,
a percentile value of round-trip time (RTT),
a minimum RTT,
a bandwidth-delay product,
a bottleneck bandwidth, or
a rate-percentile difference for different windows.

21. The method of claim 12, wherein the selection of the first congestion control algorithm from the set of congestion control algorithms is based at least in part on the first congestion control algorithm being expected to optimize, relative to one or more other congestion control algorithms of the set of congestion control algorithms, one or more of throughput or round-trip time (RTT).

22. The method of claim 12, further comprising:
selecting the second congestion control algorithm for the one or more additional communications based at least in part on one or more first performance indicators associated with the second congestion control algorithm being an improvement, by a threshold amount, compared to one or more second performance indicators associated with the first congestion control algorithm.

23. A non-transitory computer-readable medium storing a set of instructions for wireless communication, the set of instructions comprising:
one or more instructions that, when executed by one or more processors of a user equipment (UE), cause the UE to:
receive one or more machine learning models for selection of congestion control algorithms;
train the one or machine learning models for the selection of the congestion control algorithms;
obtain one or more communication parameters associated with one or more communications to be transmitted by the UE;
transmit the one or more communications using a first congestion control algorithm selected from a set of candidate congestion control algorithms using the one or more machine learning models, the first congestion control algorithm being selected based at least in part on the one or more communication parameters;
obtain an update to the one or more communication parameters; and
transmit one or more additional communications using a second congestion control algorithm, that is different from a first congestion control algorithm type, based at least in part on the update.

24. The non-transitory computer-readable medium of claim 23, wherein the one or more instructions further cause the UE to:
select the first congestion control algorithm from the set of candidate congestion control algorithms based at least in part on providing the one or more communication parameters as inputs to the one or more machine learning models.

25. The non-transitory computer-readable medium of claim 23, wherein the one or more instructions further cause the UE to:
select the first congestion control algorithm at a start of a transmission control protocol (TCP) connection, or
select the first congestion control algorithm after transmitting or receiving communications via the TCP connection.

26. The non-transitory computer-readable medium of claim 23, wherein the one or more instructions further cause the UE to:
select the second congestion control algorithm for the one or more additional communications based at least in part on one or more first performance indicators associated with the second congestion control algorithm being an improvement compared to one or more second performance indicators associated with the first congestion control algorithm.

27. An apparatus for wireless communication, comprising:
means for receiving one or more machine learning models for selecting congestion control algorithms;
means for training the one or machine learning models for selecting congestion control algorithms;
means for obtaining one or more communication parameters associated with one or more communications to be transmitted by the apparatus;
means for transmitting the one or more communications using a first congestion control algorithm selected from a set of candidate congestion control algorithms using the one or more machine learning models, the first congestion control algorithm being selected based at least in part on the one or more communication parameters;
means for obtaining an update to the one or more communication parameters; and
means transmitting one or more additional communications using a second congestion control algorithm, that is different from a first congestion control algorithm type, based at least in part on the update.

28. The apparatus of claim 27, further comprising:
means for selecting the first congestion control algorithm from the set of candidate congestion control algorithms based at least in part on providing the one or more communication parameters as inputs to the one or more machine learning models.

29. The apparatus of claim 27, further comprising:
means for selecting the first congestion control algorithm at a start of a transmission control protocol (TCP) connection, or
means for selecting the first congestion control algorithm after transmitting or receiving communications via the TCP connection.

30. The apparatus of claim 27, further comprising:
means for selecting the second congestion control algorithm for the one or more additional communications based at least in part on one or more first performance indicators associated with the second congestion control algorithm being an improvement compared to one or more second performance indicators associated with the first congestion control algorithm.

* * * * *